United States Patent [19]

Hirsch

[11] 3,848,738

[45] Nov. 19, 1974

[54] KEEPING MEANS FOR KEEPING STORAGE BOXES FOR COMPACT CASSETTES

[75] Inventor: Karl Hirsch, Klagenfurt, Austria

[73] Assignee: Firma Karl Hirsch OHG Plastikwarenerzeugung, Klagenfurt, Austria

[22] Filed: May 24, 1973

[21] Appl. No.: 363,719

[30] Foreign Application Priority Data

May 29, 1972 Austria .............................. 4637/72

[52] U.S. Cl. ................................ 206/387, 206/472
[51] Int. Cl. ............................................ A45c 11/00
[58] Field of Search ............. 206/387, DIG. 36, 472

[56] References Cited

UNITED STATES PATENTS

| | | | |
|---|---|---|---|
| 3,593,845 | 7/1971 | Schwartz | 206/387 |
| 3,604,556 | 9/1971 | Schwartz | 206/387 |
| 3,743,081 | 7/1973 | Roberg | 206/387 |

*Primary Examiner*—George E. Lowrance
*Assistant Examiner*—Douglas B. Farrow
*Attorney, Agent, or Firm*—Ernest G. Montague; Karl F. Ross; Herbert Dubno

[57] ABSTRACT

The storage boxes to be kept have a body including a rear wall, and a hinged cover pivoted to said body adjacent to said rear wall and comprising a holder adapted to hold a compact cassette in said hinged cover. The hinged cover is pivotally movable relative to said body between a closed portion, in which said hinged cover extends transversely to said rear wall and a compact cassette held by said holder is accommodated in said body, and an open position, in which said hinged cover extends generally parallel to said rear wall and a compact cassette held by said holder is disposed outside said body. The keeping means comprises at least two hinged leaves. Each of said leaves has at least one receptacle side, which faces another of said leaves, and is provided on said receptacle side with longitudinal and transverse walls, which define receptacles, each of which is adapted to receive the body of one of said boxes. Said transverse walls are provided with stops adapted to hold said bodies in said receptacles in a predetermined position in which said rear walls extend adjacent to and parallel to respective longitudinal walls and define clearance spaces therewith which are sufficiently large to enable a movement of each of said covers to said open position.

11 Claims, 5 Drawing Figures

KEEPING MEANS FOR KEEPING STORAGE BOXES FOR COMPACT CASSETTES

This invention relates to a folder or album for keeping compact cassettes which are contained in storage boxes. Folders are known which serve to keep compact cassettes contained in storage boxes and comprise covers which are provided on the inside with receptacles, which are defined by walls and serve to receive the storage boxes which contain the compact cassettes. In such storage boxes, the compact cassettes are contained in a hinged cover and held therein by a holder. For this reason, the storage boxes contained in the known folders or albums must be removed from their receptacles so that the box can be opened. The box cannot be opened when it is in the receptacle because the hinged cover cannot be pivotally moved in that case. This results in disadvantages because the empty boxes used to hold the compact cassettes lie around or, if the storage boxes have been returned into the folder or album, they must be removed again from their receptacle to receive the compact cassette when the same has been played.

Other keeping means which have only pockets for receiving the storage boxes holding the compact cassettes can be handled only with difficulty and have the disadvantage that it is difficult to store them.

It is an object of the invention to provide a folder or album in which the storage boxes which contain the compact cassettes can be kept in such a manner that the boxes are left in the folder or album and can be opened in a simple manner to receive the compact cassettes. In this way it should be possible to keep the boxes in an orderly, clear arrangement. Finally, it is desired to provide keeping means which can be manufactured in a simple manner and at low cost and which are light in weight but have a high stability so that they prevent damage to the storage boxes as well as the compact cassettes contained therein.

The invention relates to a folder or album, which comprises covers that are formed on the inside with receptacles that are defined by walls and serve to contain the storage boxes, which have in a hinged cover a holder for the compact cassettes. The invention resides in that the transverse walls are provided with projections for holding the body of the boxes in such a position that there is a clearance space between the rear side of the boxes and the opposite longitudinal wall so that the hinged cover of the box can be pivotally moved to a position in which it is at right angles to the box body.

According to another feature of the invention, stops for engagement with the body of the storage boxes are provided on the transverse walls adjacent to the clearance space. Also in accordance with the invention, a stop for engaging the rear wall of the holder provided in the hinged cover may be provided adjacent to the clearance space and said stop may be arranged to engage the rear wall of the holder provided in the hinged cover of the storage box when the hinged cover is in its closed position. It is also in accordance with the invention to provide in a bottom of the receptacle a recess which adjoins the clearance space.

In one embodiment of the invention, gripping holes are formed in the longitudinal walls.

In the folder or album according to the invention the body of the storage box is reliably held in such a position that the hinged cover can be opened in a simple manner. The clearance space enables an opening of the hinged cover to a position in which the hinged cover extends at right angles to the body of the box. When the hinged cover is in this position, a compact cassette can easily be removed from or replaced into the hinged cover. The gripping holes in the longitudinal walls facilitate the opening of the cover.

To facilitate the manufacture of the folder or album according to the invention, the longitudinal and transverse walls which define the receptacle and are provided with the projections, stops, and gripping holes consist of deep-drawn portions which are integral with the bottom and connected to the covers of the folder or to the covers and leaves of the album. When consisting of such deep-drawn portions, the longitudinal and transverse walls have a sufficiently high elasticity to ensure that the storage boxes will be reliably held in position as well as an adequate stiffness.

Details of the invention will be explained more fully with reference to the accompanying drawing, which shows diagrammatically and by way of example an embodiment of a folder for keeping compact cassettes contained in storage boxes.

Figure 1:
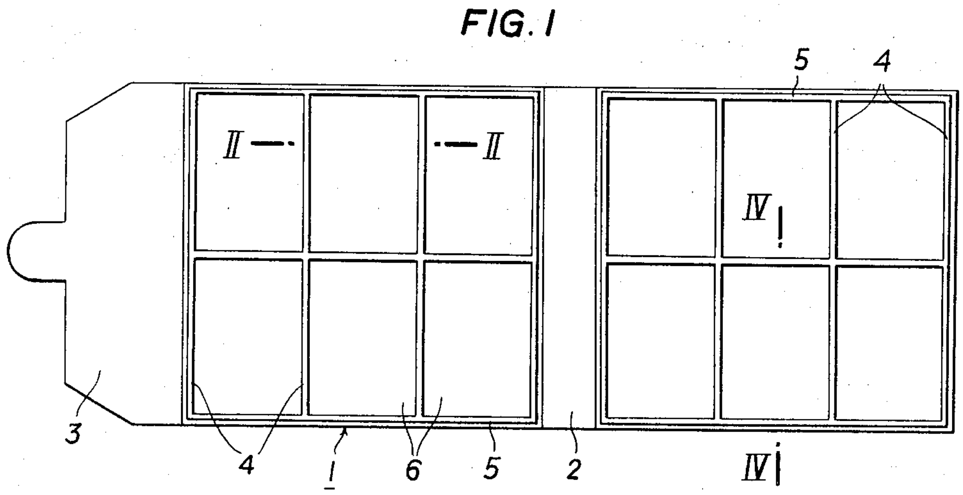
FIG. 1 is an inside view showing the folder.

The folder which is shown comprises two covers 1, which are interconnected by a frame 2 and can be closed by a flap 3. Receptacles 6 are provided on the inside of the covers 1 and are defined by longitudinal walls 4 and transverse walls 5. The storage boxes which contain the compact cassettes can be inserted in these receptacles. When the folder has been closed, it can be kept in a horizontal or vertical position. The folder can be provided on its back with suitable inscriptions.

Figure 2:
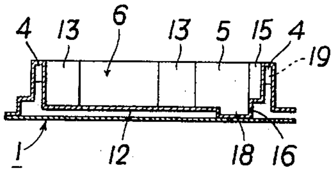
FIG. 2 is a transverse sectional view taken on line II—II in FIG. 1 or FIG. 3.
Figure 5:
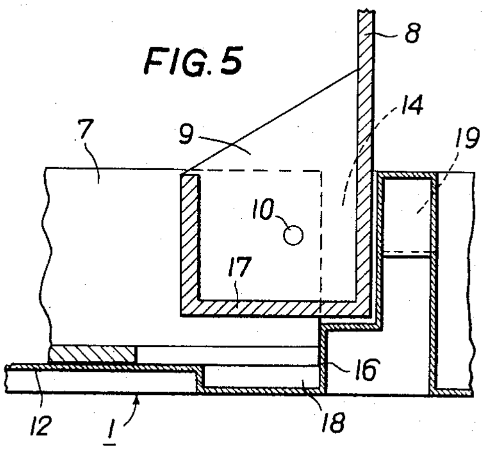
FIG. 5 is an enlarged sectional view taken on line II—II in FIG. 1 or FIG. 3 and showing a detail.
Figure 3:
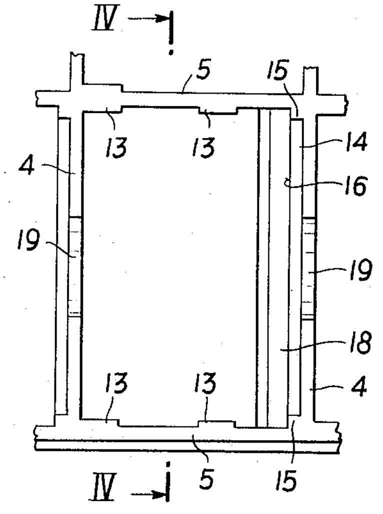
FIG. 3 is a top plan view showing a single receptacle.
Figure 4:
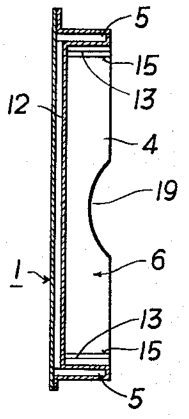
FIG. 4 is a sectional view taken on line IV—IV in FIG. 1 or FIG. 3.

As is shown more fully in FIGS. 2 to 5, the transverse walls 5 are provided with projections 13 for holding the body 7 of the storage boxes. A clearance space 14 is disposed on the rear side of the box opposite to the adjacent longitudinal wall 4 and surrounds the hinged cover 8 of the storage box. The hinged cover 8 is pivoted to the body 7 by a hinge 7. This clearance space permits of an upward pivotal movement of the hinged cover 8 to a position in which the hinged cover is at right angles to the body 7. This is apparent from FIGS. 2 and 5. To ensure that the storage box will be held in the correct position in the receptacle 6 and the clearance space 14 will be held open, the transverse walls 5 will be provided with stops 15, which are engaged by the end edge of the body 7 of the storage box. Another stop 16 is provided adjacent to the clearance space 14, and when the storage box is closed the stop 16 cooperates with the rear wall 17 of the holder 9 provided in the hinged cover 8 for the compact cassettes. The bottom 12 of the receptacles 6 is provided with a recess 18, which adjoins the stop 16 and permits of a pivotal movement of the hinged cover 8. Gripping holes 19 are formed in the longitudinal walls 4 to facilitate the pivotal movement of the hinged cover 8.

The individual walls provided with the projections and stops consist of deep-drawn hollow parts so that material is saved, and the parts are sufficiently stiff and sufficiently elastic to ensure a reliable holding of the storage boxes for the compact cassettes in the receptacles when the hinged cover thereof is opened and closed without a need for an additional holding of the storage box in position.

The embodiment which has been shown and described serves only to facilitate the nature of the invention, which is not restricted to details.

What is claimed is:

1. Keeping means for keeping storage boxes having a body including a rear wall, and a hinged cover pivoted to said body adjacent to said rear wall and comprising a holder adapted to hold a compact cassette in said hinged cover, said hinged cover being pivotally movable relative to said body between a closed position, in which said hinged cover extends transversely to said rear wall and a compact cassette held by said holder is accommodated in said body, and an open position, in which said hinged cover extends generally parallel to said rear wall and a compact cassette held by said holder is disposed outside said body, said keeping means comprising at least two hinged leaves, each of said leaves having at least one receptacle side, which faces another of said leaves, and is provided on said receptacle side with longitudinal and transverse walls, which define receptacles, each of which is adapted to receive the body of one of said boxes, said transverse walls being provided with stops adapted to hold said bodies in said receptacles in a predetermined position in which said rear walls extend adjacent to and parallel to respective longitudinal walls and define clearance spaces therewith which are sufficiently large to enable a movement of each of said covers to said open position.

2. Keeping means as set forth in claim 1, which comprise only two of said leaves which constitute covers.

3. Keeping means as set forth in claim 1, in which said leaves comprise two covers and at least one additional leaf between said covers.

4. Keeping means as set forth in claim 1, in which said transverse walls are provided with stops, each of which is disposed adjacent to one of said clearance spaces and arranged to be engaged by one of said bodies when said one body is in said predetermined position.

5. Keeping means as set forth in claim 1, for keeping such storage boxes in which said holder has a rear wall, said keeping means comprising stops, each of which is disposed adjacent to one of said clearance spaces and arranged to engage said rear wall of one of said holders when the associated body is in said predetermined position and the associated hinged cover is in said closed position.

6. Keeping means as set forth in claim 1, which comprise receptacle bottom means which are connected to said leaves and define said receptacles together with said longitudinal and transverse walls and are formed with a recess adjacent to each of said clearance spaces.

7. Keeping means as set forth in claim 1, in which said longitudinal walls are formed with gripping holes.

8. Keeping means as set forth in claim 1, which comprise receptacle bottom means which are connected to said leaves and define receptacles together with said longitudinal and transverse walls, said longitudinal and transverse walls consisting of deep-drawn portions which together with said stops are integral with said receptacle bottom means.

9. Keeping means as set forth in claim 8, in which said transverse walls are integrally formed with stops each of which is disposed adjacent to one of said clearance spaces and arranged to be engaged by one of said bodies when said one body is in said predetermined position.

10. Keeping means as set forth in claim 8, for keeping such storage boxes in which said holders have a rear wall, said keeping means comprising stops, which are integral with said deep-drawn portions and each of which is disposed adjacent to one of said clearance spaces and arranged to engage said rear wall of one of said holders when the associated body is in said predetermined position and the associated hinged cover is in said closed position.

11. Keeping means as set forth in claim 8, in which said longitudinal walls are formed with gripping holes.

* * * * *